Figures 1, 2, 3:
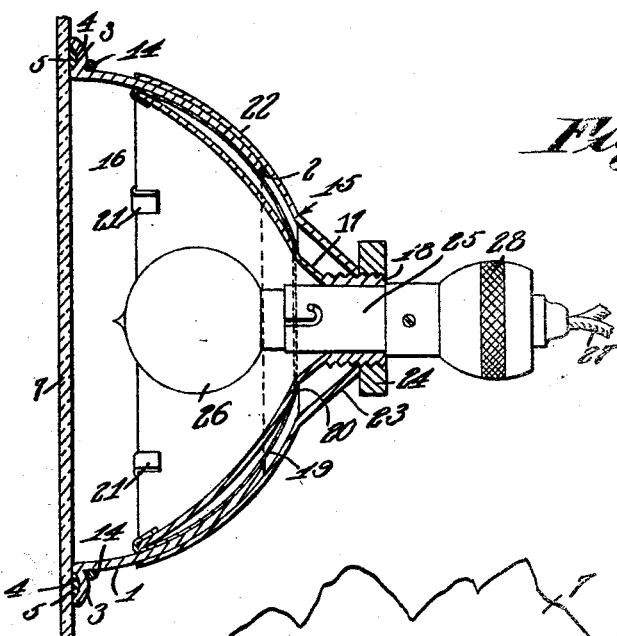

Feb. 3, 1925.

E. W. REIBER 1,525,200

SPOTLIGHT SUPPORTING MEANS

Filed May 24, 1922

Inventor
E. W. Reiber
By Cashow & Co.
Attorney

Patented Feb. 3, 1925.

1,525,200

UNITED STATES PATENT OFFICE.

EDWARD W. REIBER, OF ADRIAN, MICHIGAN.

SPOTLIGHT-SUPPORTING MEANS.

Application filed May 24, 1922. Serial No. 563,309.

*To all whom it may concern:*

Be it known that I, EDWARD W. REIBER, a citizen of the United States, residing at Adrian, in the county of Lenawee and State of Michigan, have invented a new and useful Spotlight-Supporting Means, of which the following is a specification.

This invention aims to provide, in combination with the pane and frame of a windshield for vehicles, novel means for holding a lamp against the pane.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in section, a device constructed in accordance with the invention, mounted on the pane of an automobile wind shield frame; and Figure 2 is a rear elevation showing the device mounted in place on the wind shield. Figure 3 is a fragmental sectional view showing a slight modification in the invention.

The device forming the subject matter of this application comprises a forward member 1 which preferably is of parti-spherical form, the said member having an opening 2 in its rear end. At its forward end, the member 1 is supplied with an outstanding marginal flange 3, which is concaved to form a seat 4, wherein a packing 5, of whip cord or other suitable material is located. The numeral 6 marks the frame of the wind shield of an automobile, the frame carrying a glass pane 7. The forward member 1 is held against the pane 7, so that the pane constitutes a lens or closure for the forward member. Any suitable means may be provided for holding the forward member 1 against the pane 7, as shown in Figure 1. If desired, but not of necessity, a securing element 8, such as a bolt, may be mounted in the frame 6. The numeral 9 denotes a bracket including a loop-shaped keeper 10 engaged about the securing element 8 and held thereby on the frame 6, the ends of the keeper 10 merging into oppositely extended coil springs 11, which are prolonged to form diverging resilient arms 12 having curved ends 14 adapted to fit securely but releasably about the forward member 1, the ends 14 of the arms 12 being lodged in the angle defined by the member 1 and its flange 3. The springs 11 cooperating with the arms 12 and the parts 14 of the bracket 9, tend to press the member 1 against the pane 7 of the wind shield, the packing denoted by the numeral 5 affording a tight joint. The forward member 1 and parts associated therewith (hereinafter described) may be removed from between the ends 14 of the arms 12, by sliding the member 1 in the direction of the arrow A in Figure 2, the parts 12—14 yielding to permit the withdrawal of the member 1.

It is not absolutely essential that the bracket 9 be used. Thus, in Figure 3, the pane of the wind shield frame is denoted by the numeral 29, the forward member by the numeral 30, the flange on the forward member by the numeral 31, and the packing by the numeral 32. In this form of the invention the forward member is held on the pane by securing elements 33, such as small bolts, openings being formed in the flange 3 and in the pane 29, for the reception of the bolts.

The lamp embodies a movable rear member 15, which is a composite structure. The rear member 15 embodies a reflector 16 having a reduced neck 17 secured to an externally threaded sleeve 18. The reflector 16 is located within a shell 19, shaped to fit closely but slidably within the forward member 1 of the lamp, the shell having an opening 20 in its rear end, through which the neck 17 of the reflector 16 passes, the rear end of the shell abutting against the reflector. At its forward end, the shell 19 is supplied with fingers 20, bent to extend across the forward edge of the reflector, as shown in Figure 16, the shell and the reflector thus being held together for movement in one piece.

An outer casing 22 fits closely but slidably upon the forward member 1 and has a reduced end 23 surrounding the sleeve 18. A nut 24 is threaded on the sleeve 18 and bears against the end 23 of the casing 22. The tendency of the nut 24, when the same is advanced, is to advance the casing 22 and to draw the reflector 16 and the shell 19 rearwardly, the rear member 15 of the lamp thus having a close but slidable fit upon the main or forward member 1.

A socket 25 is held in the sleeve 18 and carries an electric lamp 26 disposed within the reflector 16. The conductors 28 for the lamp 26 extend rearwardly through the socket 15. A rotary switch 28 is journaled on the socket 25 and is interposed in the circuit of the lamp 26, so that the lamp may be lighted or extinguished at will. The construction of the switch 28 need not be described in detail, because any desired form of switch may be used, and because I am aware of the fact that a spot lamp cannot be characterized patentably by any specific form of electrical switch.

In practical operation, the rear member 15 may be shifted on the forward member 1, whereby the rays proceeding from the lamp 26 may be projected forwardly or laterally, in any desired direction, within the scope of the movement of the rear member 15 on the forward member 1.

The forward member 1 is held against the rear or inner surface of the pane 7 of the wind shield frame 6, and, consequently, the lamp is disposed within the vehicle and within easy reach of the driver. The wind shield frame may be shifted as occasion may demand, the lamp moving with the wind shield frame, and the movement of the wind shield frame being in no wise impeded by reason of the fact that the lamp is mounted upon it. Owing to the fact that the forward member 1 is held directly against the pane 7 of the wind shield frame 6, the light rays proceeding from the lamp 26 will not be reflected backwardly by the pane 7 into the eyes of the driver, it being a matter of common knowledge that when a lamp is disposed within a vehicle, at some spaced distance from the wind shield pane, the pane produces a backward glare which is distasteful to the driver of the car and which, often prevents him from having an adequate view of the highway ahead.

Generally stated, the device forming the subject matter of this application possesses the advantages of a spot-light which is adjustable at the will of an operator, the spotlight being located within the car, and in easy reach of the operator, all back glare from the wind shield being avoided.

Having thus described the invention, what is claimed is:—

The combination with the pane and frame of a windshield for vehicles, of means for holding a lamp against the pane, said means comprising a projection on the frame, two spaced coiled springs connected by a loop-shaped keeper engaging the projection, and diverging resilient arms at the outer ends of the springs, the arms having curved lamp-gripping ends.

In testimony that I claim the foregoing as my own, I have hereto affixed my signature in the presence of two witnesses.

EDWARD W. REIBER.

Witnesses:
 FRANK B. BAUER,
 R. A. KAISER.